US008984157B2

(12) United States Patent
Dalmia et al.

(10) Patent No.: US 8,984,157 B2
(45) Date of Patent: Mar. 17, 2015

(54) NETWORK ANALYSIS IN A FILE TRANSFER SYSTEM

(75) Inventors: Vedika Dalmia, Utter Pradesh (IN); Thomas I. Lewin, Hempshire (GB); James W. Smith, Fife (GB); Peter F. Weller, Suffolk (GB)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 13/551,820

(22) Filed: Jul. 18, 2012

(65) Prior Publication Data
US 2014/0025840 A1  Jan. 23, 2014

(51) Int. Cl.
*H04L 1/00* (2006.01)
*G06F 15/16* (2006.01)

(52) U.S. Cl.
CPC .. *H04L 1/00* (2013.01); *G06F 15/16* (2013.01)
USPC ............... 709/232; 726/13; 726/14; 709/206; 709/203; 707/602

(58) Field of Classification Search
CPC ....... H04L 63/0227; H04L 1/00; G06F 15/16; G06F 11/00; H04N 21/23897
USPC ............................. 709/232, 206; 726/13, 14
See application file for complete search history.

(56) References Cited

U.S. PATENT DOCUMENTS

| 4,852,088 | A | * | 7/1989 | Gulick et al. ................. 370/413 |
| 5,568,476 | A | * | 10/1996 | Sherer et al. ................. 370/236 |
| 5,633,865 | A | * | 5/1997 | Short ............................ 370/412 |
| 6,363,429 | B1 | | 3/2002 | Ketcham |
| 6,529,521 | B1 | * | 3/2003 | MacArthur ................... 370/463 |
| 7,349,406 | B1 | * | 3/2008 | Robins et al. ............. 370/395.41 |
| 7,568,019 | B1 | | 7/2009 | Bhargava et al. |
| 7,594,226 | B2 | * | 9/2009 | Stelzer et al. ................. 717/178 |
| 7,684,320 | B1 | | 3/2010 | Nucci |
| 7,979,577 | B2 | * | 7/2011 | Taylor et al. .................. 709/238 |
| 7,990,878 | B2 | | 8/2011 | Young et al. |
| 8,127,025 | B2 | * | 2/2012 | Visalli et al. .................. 709/228 |
| 8,140,703 | B2 | * | 3/2012 | Morris et al. ................. 709/233 |
| 8,612,530 | B1 | * | 12/2013 | Sapovalovs et al. .......... 709/206 |
| 2003/0053475 | A1 | * | 3/2003 | Veeraraghavan et al. ..... 370/431 |
| 2003/0110285 | A1 | * | 6/2003 | Banerjee et al. .............. 709/236 |
| 2004/0261133 | A1 | * | 12/2004 | Niida et al. .................... 725/141 |
| 2005/0119905 | A1 | | 6/2005 | Wong et al. |

(Continued)

OTHER PUBLICATIONS

Heady et al., "The Architecture of a Network Level Intrusion Detection System", 1990.*

(Continued)

*Primary Examiner* — O. C. Vostal
(74) *Attorney, Agent, or Firm* — Douglas A. Lashmit; Hoffman Warnick LLC

(57) ABSTRACT

Aspects of the invention are directed to a method and system for discovering business content transfer paths in a network using file transfer information, and for calculating business risk per network component in a network. A method according to an embodiment includes: obtaining file transfer information for a plurality of file transfers between a plurality of nodes within a network; generating a confidence of correlation for each pair of file transfers in the plurality of file transfers; determining interdependencies between the plurality of file transfers based on the confidence of correlation for each pair of file transfers; and determining a business content transfer path based on the interdependencies between the plurality of file transfers.

13 Claims, 5 Drawing Sheets

(56) References Cited

U.S. PATENT DOCUMENTS

| | | | |
|---|---|---|---|
| 2005/0163151 A1* | 7/2005 | Ferguson et al. | 370/449 |
| 2006/0112096 A1* | 5/2006 | Ahluwalia et al. | 707/6 |
| 2006/0187927 A1* | 8/2006 | MeLampy et al. | 370/389 |
| 2006/0190549 A1* | 8/2006 | Teramae et al. | 709/208 |
| 2006/0233316 A1* | 10/2006 | Doskow et al. | 379/32.03 |
| 2007/0168590 A1* | 7/2007 | Crain II et al. | 710/71 |
| 2007/0174608 A1* | 7/2007 | Balandin et al. | 713/155 |
| 2008/0109575 A1* | 5/2008 | Dries et al. | 710/30 |
| 2008/0114806 A1* | 5/2008 | Kosche | 707/104.1 |
| 2008/0244083 A1* | 10/2008 | Guthrie et al. | 709/232 |
| 2008/0279188 A1* | 11/2008 | Alfieri et al. | 370/392 |
| 2008/0282339 A1* | 11/2008 | Nakae et al. | 726/13 |
| 2008/0291912 A1 | 11/2008 | Choi et al. | |
| 2008/0298276 A1* | 12/2008 | Chen et al. | 370/255 |
| 2009/0112667 A1 | 4/2009 | Blackwell et al. | |
| 2009/0307299 A1* | 12/2009 | Malesich et al. | 709/202 |
| 2010/0048870 A1 | 2/2010 | Young et al. | |
| 2010/0080133 A1 | 4/2010 | Oron | |
| 2010/0103837 A1* | 4/2010 | Jungck et al. | 370/252 |
| 2010/0185622 A1* | 7/2010 | Deninger et al. | 707/741 |
| 2010/0197248 A1* | 8/2010 | Balakrishnan et al. | 455/101 |
| 2010/0287402 A1* | 11/2010 | Kim et al. | 713/400 |
| 2011/0167156 A1 | 7/2011 | Mani et al. | |
| 2011/0182294 A1* | 7/2011 | Lee et al. | 370/394 |
| 2011/0296045 A1* | 12/2011 | Todd et al. | 709/231 |
| 2012/0143950 A1* | 6/2012 | Xiang | 709/204 |
| 2012/0321273 A1* | 12/2012 | Messmer | 386/224 |

OTHER PUBLICATIONS

Crovella et al., "Explaining World Wide Web Traffic Self-Similarity", 1995.*
Mah, "An Empirical Model of HTTP Network Traffic", 1997.*
Anderson et al., "A File System for Continuous Media", 1992.*
Lian et al., "Performance Evaluation of Control Networks: Ethernet, ControlNet, and DeviceNet", 2001.*

* cited by examiner

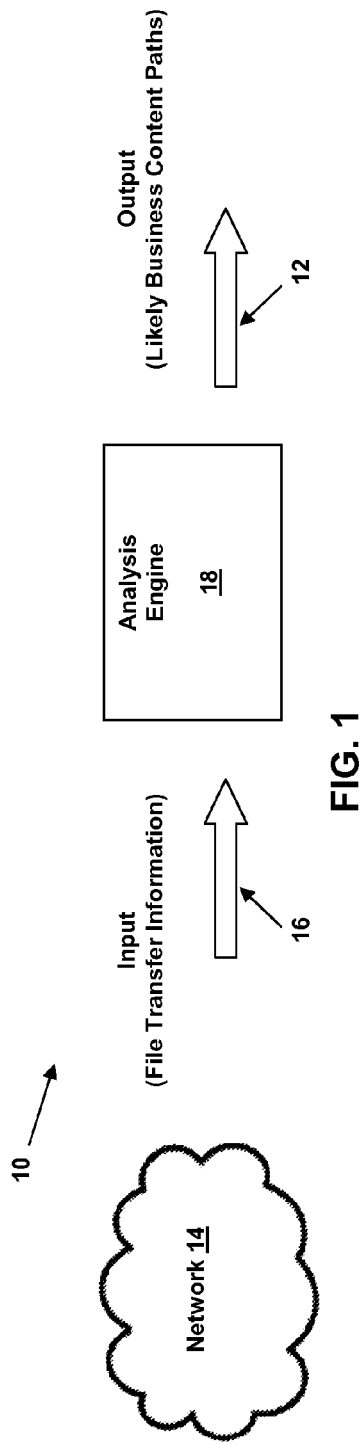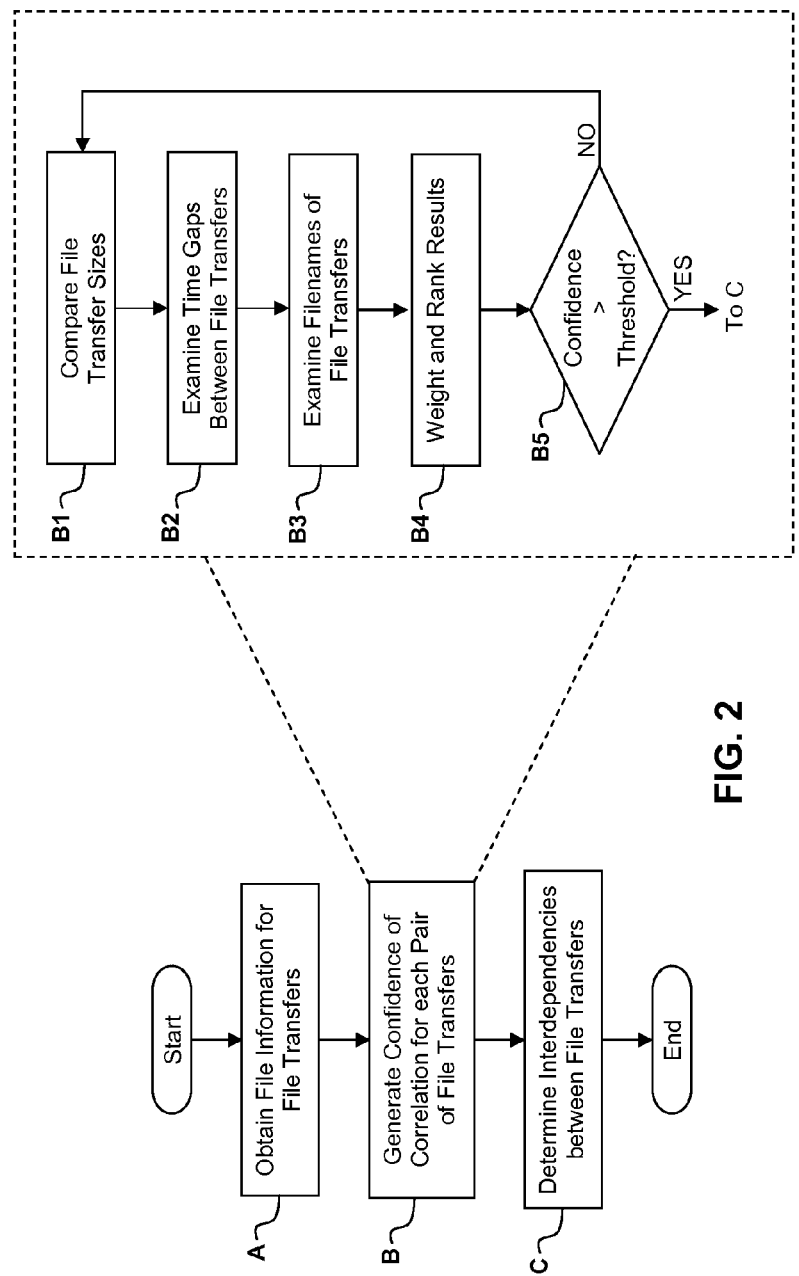
FIG. 1
FIG. 2

NETWORK ANALYSIS IN A FILE TRANSFER SYSTEM

TECHNICAL FIELD

The disclosure relates generally to networks, and more particularly, to a method and system for discovering business content transfer paths in a network using file transfer information. In addition, the disclosure relates to a method and system for calculating business risk per network component in a network.

BACKGROUND

In the networks of many large enterprises, critical business content is often transferred by a system of complex and interdependent file transfers. These types of systems can reach many thousands of nodes and links in size. Upon reaching such a magnitude, the question of inter-dependability arises. For example, a transfer from server B to server C could be dependent on a transfer from server A to server B. However, due to factors such as poor documentation, staff turnover, the complex nature of the network, etc., system administrators are typically unaware of such dependencies.

It is difficult to unravel these layers of file transfers, rendering any migration to a more robust managed file transfer system nearly impossible.

Complex networks are fragile and therefore pose an inherent risk to a business's revenue streams. Paths within such networks often have a lot of value (financial, operational, etc.) to a business. To this extent, system administrators want to minimize the risk in their networks by maximizing the stability of important network nodes.

File (e.g., business content) transfer paths may include multiple "hops" in a network, passing through an unknown number of intermediate network (e.g., server) nodes. In such a case, system administrators may only be aware of the original source and destination of the file transfer path. The indeterminate number of intermediate network nodes represents a significant financial risk to a business.

SUMMARY

Aspects of the invention are directed to a method and system for discovering business content transfer paths in a network using file transfer information. In addition, aspects of the invention are directed to a method and system for calculating business risk per network component in a network.

A first aspect of the invention provides a method for determining a business content transfer path in a network using file transfer information, comprising: obtaining file transfer information for a plurality of file transfers between a plurality of nodes within a network; generating a confidence of correlation for each pair of file transfers in the plurality of file transfers; determining interdependencies between the plurality of file transfers based on the confidence of correlation for each pair of file transfers; and determining a business content transfer path based on the interdependencies between the plurality of file transfers.

A second aspect of the invention provides an apparatus for determining a business content transfer path in a network using file transfer information by performing a method, the method comprising: obtaining file transfer information for a plurality of file transfers between a plurality of nodes within a network; generating a confidence of correlation for each pair of file transfers in the plurality of file transfers; determining interdependencies between the plurality of file transfers based on the confidence of correlation for each pair of file transfers; and determining a business content transfer path based on the interdependencies between the plurality of file transfers.

A third aspect of the invention provides a computer program comprising program code embodied in at least one computer-readable storage medium, which when executed, enables a computer system to implement a method for determining a business content transfer path in a network using file transfer information, the method comprising: obtaining file transfer information for a plurality of file transfers between a plurality of nodes within a network; generating a confidence of correlation for each pair of file transfers in the plurality of file transfers; determining interdependencies between the plurality of file transfers based on the confidence of correlation for each pair of file transfers; and determining a business content transfer path based on the interdependencies between the plurality of file transfers.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 1 depicts a system for discovering business content transfer paths in a network using file transfer information in accordance with an embodiment.

FIG. 2 depicts an illustrative process for analyzing and correlating file transfers based on file transfer information in accordance with an embodiment.

The drawings are intended to depict only typical aspects of the invention, and therefore should not be considered as limiting the scope of the invention. In the drawings, like numbering represents like elements between the drawings.

DETAILED DESCRIPTION

Figure 3:
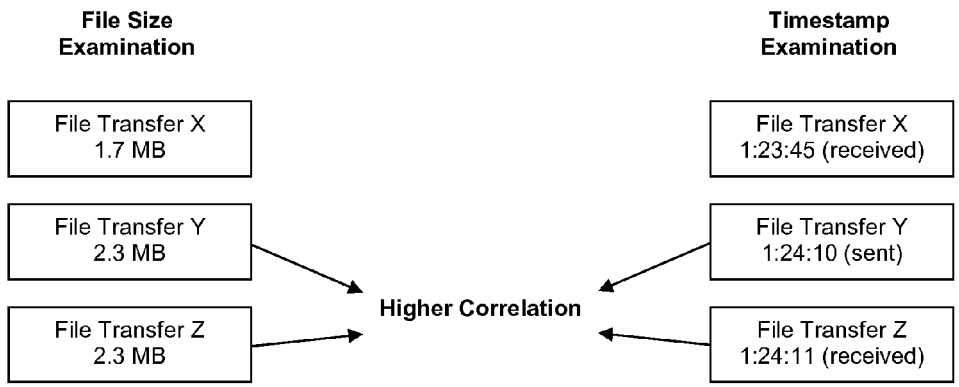
FIG. 3 depicts a correlation example in accordance with an embodiment of the present invention.

As indicated above, aspects of the invention are directed to a method and system for discovering business content transfer paths using file transfer information in a large network. In addition, aspects of the invention are directed to a method and system for calculating business risk per network component in a large network.

FIG. 1 depicts a system 10 for discovering business content transfer paths 12 in a network 14 using file transfer information 16 in accordance with an embodiment. An analysis engine 18 receives as input the file transfer information 16 for a plurality of file transfers in the network 14, and outputs likely business content transfer paths 12. The file transfer information 16 may include, for example, file sizes of the file transfers, time gaps between file transfers (determined, e.g., using timestamps of the file transfers), filenames, and/or the like. Once the file transfer information 16 is received, file transfers in the network 14 are analyzed and correlated by the analysis engine 18 to determine whether any interdependencies or connections exist among the file transfers.

The file transfer information 16 may be collected in a number of ways. For example, in an embodiment that will be presented in greater detail below, file transfer packets can be captured and packet header information associated with the captured file transfer packets can be extracted to provide the file transfer information 16. Other suitable techniques for collecting the file transfer information 16 can be used in the practice of the present invention.

An illustrative process for analyzing and correlating file transfers based on the file transfer information 16 in accordance with an embodiment will now be described with reference to FIG. 2.

At process A, file transfer information 16 for each of a plurality of file transfers is obtained. At process B, a confidence of correlation is generated for each pair of file transfers in the plurality of file transfers based on the file transfer information 16. At process C, interdependencies or connections among the file transfers are determined and this information is stored.

In an embodiment, process B includes a plurality of operations that are carried out for each pair of file transfers in the plurality of transfers based on the file transfer information 16. At operation B1, the file sizes of pairs of file transfers are compared. It has been determined that if a pair of file transfers have similar file sizes, then there is a higher likelihood that the pair of file transfers are correlated to each other. An example is depicted in FIG. 3, which shows three file transfers X, Y, and Z having file sizes of 1.7 MB, 2.3 MB, and 2.3 MB, respectively. Based on the file sizes, the file transfers Y and Z, having file sizes of 2.3 MB and 2.3 MB, respectively, have a higher correlation with each other than with the file transfer X having a file size of 1.7 MB.

Process B may further include an operation B2, at which the time gaps between file transfers are examined. This can be achieved, for example, by comparing the timestamps of file transfers to establish the presence of time patterns. Examples of possible time patterns may include reoccurring file transfers (e.g., 2 transfers at 3 pm every day), or closely related (in time) file transfers (e.g., a consistent 0.01 second gap is present between a file transfer arriving at a node and a new file transfer leaving the node). Many other examples of time patterns are possible. It has been determined that if a time pattern can be established between a pair of file transfers, then there is a higher likelihood that the pair of file transfers are correlated to each other.

FIG. 3 further depicts an example of such a time pattern examination. Based on the timestamps of the file transfers X, Y and Z at a given node, which have timestamps of 1:23.45 (received), 1:24:10 (sent), and 1:24:11 (received), respectively, it can be determined that file transfers Y and Z have a higher correlation with each other than with file transfer X because they are closely related in time. Looking at the results of the file size comparison and the timestamp comparison in this example, it appears that file transfers Y and Z are correlated to each other in some fashion.

Returning to FIG. 2, process B may further include an operation B3, at which filenames of the file transfers are examined and compared. If the network 14 is unencrypted, the filenames can be extracted from the file transfer in a known manner and compared with the filenames of other file transfers occurring in the network 14. The comparison can be preformed, for example, using a regular expression (Regex) tester of a type known in the art, or using any other suitable comparison algorithm. If two or more files transfers have the same or a similar name (e.g., as matched using Regex), then those file transfers are likely to comprise the same file at different points in a business process (e.g., in the same business content transfer path).

At B4, the results of the operations B1-B3 are weighted and ranked to provide the significance of each of the operations B1-B3 for each pair of file transfers. Although three operations B1-B3 are depicted in FIG. 2, it should be noted that one or more of the operations B1-B3 can be performed in the practice of the present invention. In an embodiment, the results of operation B1 for a pair of file transfers can be weighted higher than the results of operation B2, which can be weighted higher than the results of operation B3. To this extent, a higher correlation in file sizes between the file transfers may be more indicative of a possible interdependence of the file transfers than any correlation between time gaps and/or filenames. The specific weighting factors may be dependent, for example, on the type and/or structure of network 14, the type of the files transferred within the network, the results of previous correlation analyses performed on the network 14, the experience of the system administrator, and/or many other factors. In another embodiment, the results of the operations B1-B3 may be weighted equally, or in a manner different than in the example described above.

At operation B5, the weighted results of operation B4 are combined and compared to a threshold value, corresponding to a desired confidence of correlation for each pair of file transfers. If the weighted results are greater than the threshold value (YES, B5), flow passes to process C. If not (NO, B5), the examination metrics can be adjusted and operations B1-B3 can be repeated as necessary. The threshold value is application specific and can vary according to the needs of the users of the present invention.

Returning to process C, the interdependencies or connections among each pair of file transfers are analyzed by the analysis engine 18. The analysis engine 18 chains the linked file transfers together using techniques such as those detailed above to identify network nodes and links that are part of related business processes. For example, if a file transfer from node $N_A$ to node $N_B$ is linked to a file transfer from node $N_B$ to node $N_C$, and the file transfer from node $N_B$ to node $N_C$ is linked to a file transfer from node $N_C$ to node $N_D$, then there is a good chance that a business content transfer path exists from nodes $N_A$ to $N_B$ to $N_C$ to $N_D$.

In an embodiment, the present invention determines file transfers from packet streams by examining only the packet headers. File sizes are determined by looking for time breaks and size discrepancies in packet data. This information is correlated to determine what series of transfers represents a file. From this, the beginning and end of a file transfer along with its size, source and destination can be deduced.

The present invention provides a way of determining file transfer information, without reassembling the file, as occurs in existing applications. The fact that the file is never reassembled delivers clear value in many areas. For example, the lack of reassembly results in a lower total time to determine the relevant information. In addition, less storage is needed, as the files are not reassembled and thus do not need to be stored. Further, the packets themselves do not give an indicator as to the contents of the files. This has important implications for clients who wish to know the relevant file transfer information, but value their confidentiality.

Apart from the obvious speed advantages, the present invention provides other advantages for clients who wish to know the about file transfers in their network, but value their confidentiality. Advantages provided by the present invention may include, for example:
1) Less storage required to examine files;
2) Less computation required to examine correlations;
3) No intrusive deep packet inspection;
4) Protection against infected files; and
5) Continues to work with encrypted traffic.
These advantages are not replicated by existing solutions, as existing solutions require reassembly of the files.

Figure 4:
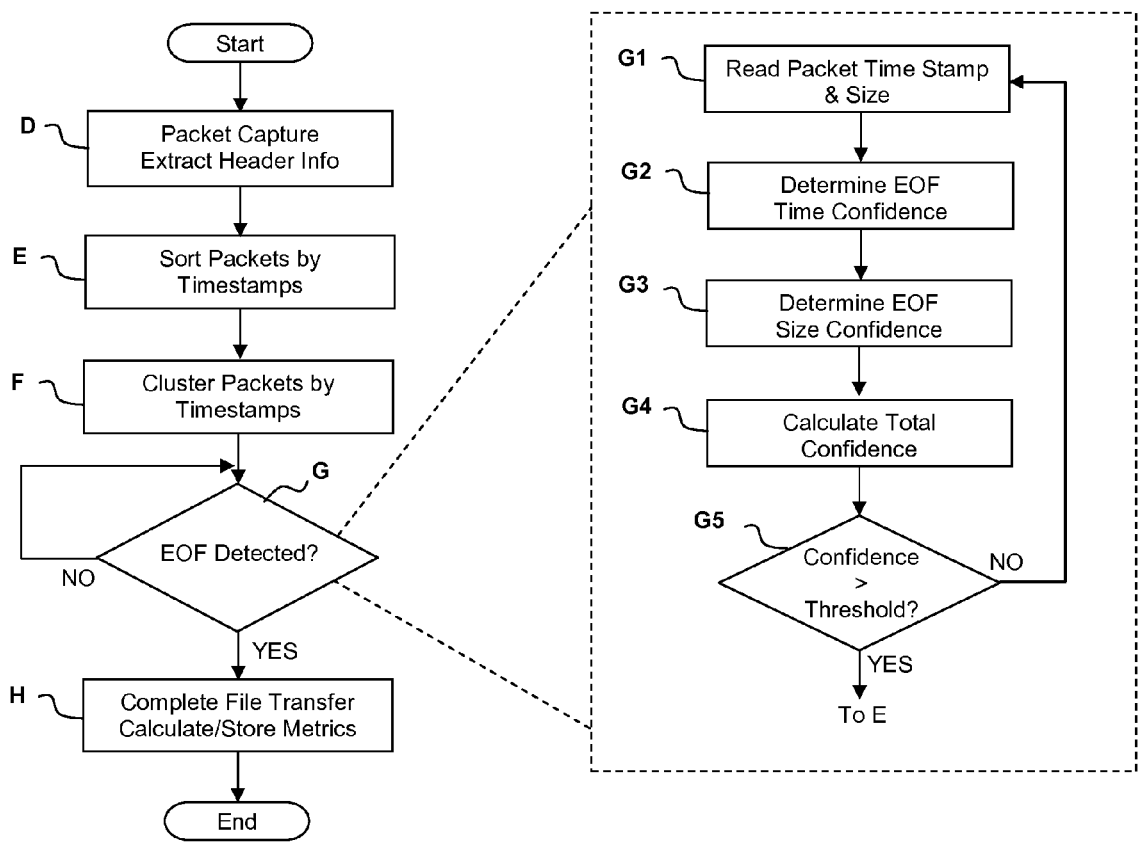
FIG. 4 depicts a process flow diagram for determining an end of file (EOF) in accordance with an embodiment of the present invention.

An embodiment of a process in accordance with the present invention is depicted in FIG. 4. At process D, the present invention performs packet capture on the network 14 and extracts header information (e.g., timestamps, size) from observed traffic. This header information is collated based on directed links (e.g., source to destination) and examined to detect file transfers. File Transfers are made up of an indeterminate number of packets, and each packet is around 1 kB in size. Therefore, a file that is 3 MB will have approximately 3000 packets.

At process E, the packets are sorted by timestamp (e.g., ascending timestamp). At process F, the packets are clustered. Packets may be clustered, for example, by identifying gaps in their sequential timestamps. As packets are relatively small (e.g., around 1 kB), a modern network connection will take no longer than a few milliseconds to transmit a packet and move onto the next packet. Therefore, a larger gap (e.g., greater than 1 second) between sequential packet transfers in a time-ordered list is likely to indicate a break in the file transfer and is likely to pin-point the completion of one file transfer and the start of another file transfer.

At process G, for each packet cluster, an attempt is made to determine the end of file (EOF).

Figure 5:
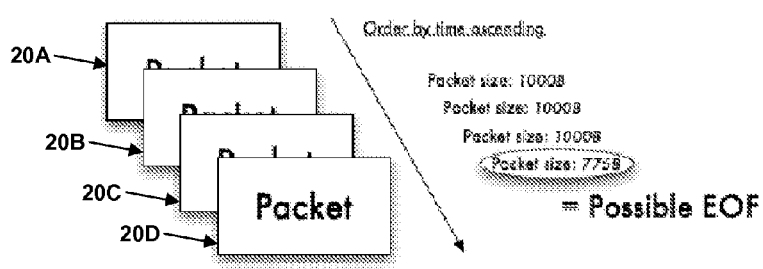
FIG. 5 an EOF example in accordance with an embodiment of the present invention.

As known in the art, each file is segmented into a number of packets before transmission (e.g., a 3 MB file has 3072 Packets at 1 KB each). However, not all files are exactly divisible by 1 kB. Those that are not will have a particular transmission pattern: a series of files at the maximum packet size (1 kB), followed by a final packet with the remainder from the packet size division. An example of this is depicted in FIG. 5, which depicts a plurality of packets 20A-20D ordered by ascending time. As shown, packets 20A-20C have the maximum packet size of 1 kB, while packet 20D has a packet size of 775 bytes. To this extent, packet 20D may comprise a possible EOF.

If there are multiple, concurrent file transfers from the same source to the same destination, the solution will handle this by identifying a plurality of parameters that differentiate TCP connections: source IP, destination IP, source port and destination port, for example. TCP requires that each set of (source+destination) ports and (source+destination) IPs be unique.

The present invention combines the information regarding time gaps and file sizes for each directed link to determine EOF information and its confidence level.

Process G, which attempts to determine the end of file (EOF) for each packet cluster, includes a plurality of operations. At operation G1, the timestamp and size of a packet in a packet cluster are read. At operation G2, an EOF time confidence is determined by calculating a time jump from a previous packet to a current packet. A higher than expected time jump may indicate a higher likelihood of EOF. At operation G3, an EOF size confidence is determined by calculating the difference in packet size from the previous packet to the current packet. A packet with a size that is less than maximum packet size may indicate EOF. At operation G4, a total confidence, based on a combination of the time confidence and the size confidence, is calculated. At operation G5, the total confidence is compared to a threshold value to determine if the packet is an EOF packet. If the total confidence is greater than the threshold value (YES, G5), flow passes to process H, where the file transfer is completed and file transfer metrics are determined and stored. If not (NO, G5), the examination metrics can be adjusted and process G can be repeated as necessary for another packet in the packet cluster. The threshold value is application specific and can vary according to the needs of the users of the present invention.

As noted above, complex business networks are often fragile and therefore pose an inherent risk to a business's revenue streams. Paths within such networks often have a lot of value (financial, operational, etc.) to a business. To this extent, system administrators want to minimize the risk in their networks by maximizing the stability of important network nodes.

Business content transfer paths may include multiple "hops" in a network, passing through an unknown number of intermediate network (e.g., server) nodes. In such a case, system administrators may only be aware of the original source and destination of the file transfer path. The indeterminate number of intermediate network nodes represents a significant financial risk to a business. It would be useful, therefore, to be able to identify network nodes that are most at risk for failure and the associated business costs associated therewith.

The present invention provides a way of combining network infrastructure, traffic, and business process information to give a business risk value to each network component. This is accomplished by applying business process values (e.g., monetary importance, importance to company reputation, importance to clients/business partners, etc.) to each network component.

Figure 6:
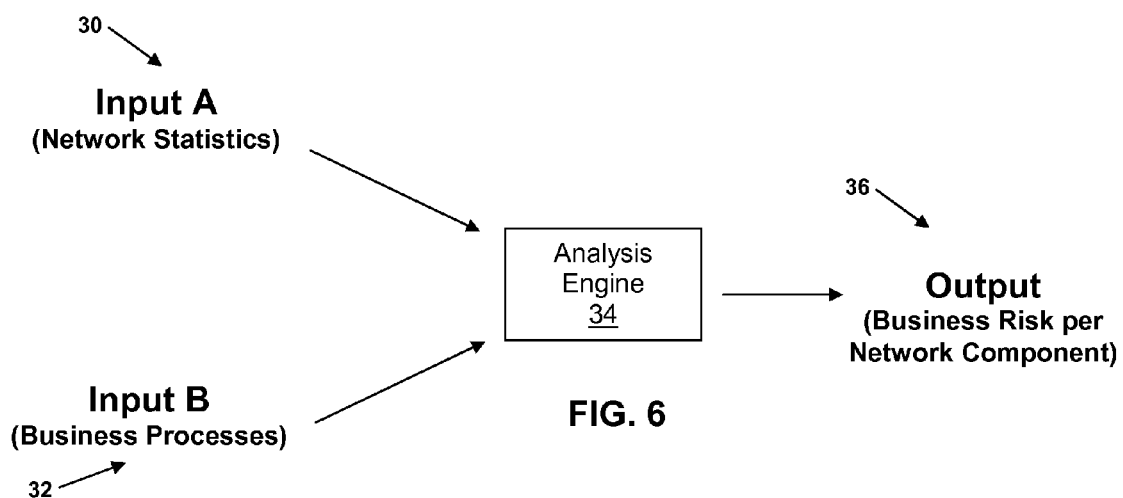
FIG. 6 depicts a system for a assigning a quantifiable risk to network components identified in business content transfer paths in accordance with an embodiment.

This present invention provides a way of analyzing how much risk is associated with a node in a network by using the properties of the infrastructure and values associated with business processes. Information is obtained and combined from multiple sources to determine a business risk for a given network node. In an embodiment, as depicted in FIG. 6, network information 30 (e.g., network statistics) and business process information 32 are obtained and passed through an analysis engine 34, which is configured to compute a business risk per node 36. Nodes on specific business content transfer paths are then examined for graph centrality to provide a metric of importance. This provides the attributes of being able to ascertain node importance without physically damaging the network to detect the impact of failure. It also allows easy visualization of node importance, as node appearance on visualization software can be scaled according to the centrality metric. This allows a non-technical audience to quickly grasp the relevance of particular nodes to a networks robustness. In addition, this can help to make the case for prioritization of improvements to the robustness of a network.

Figure 7:
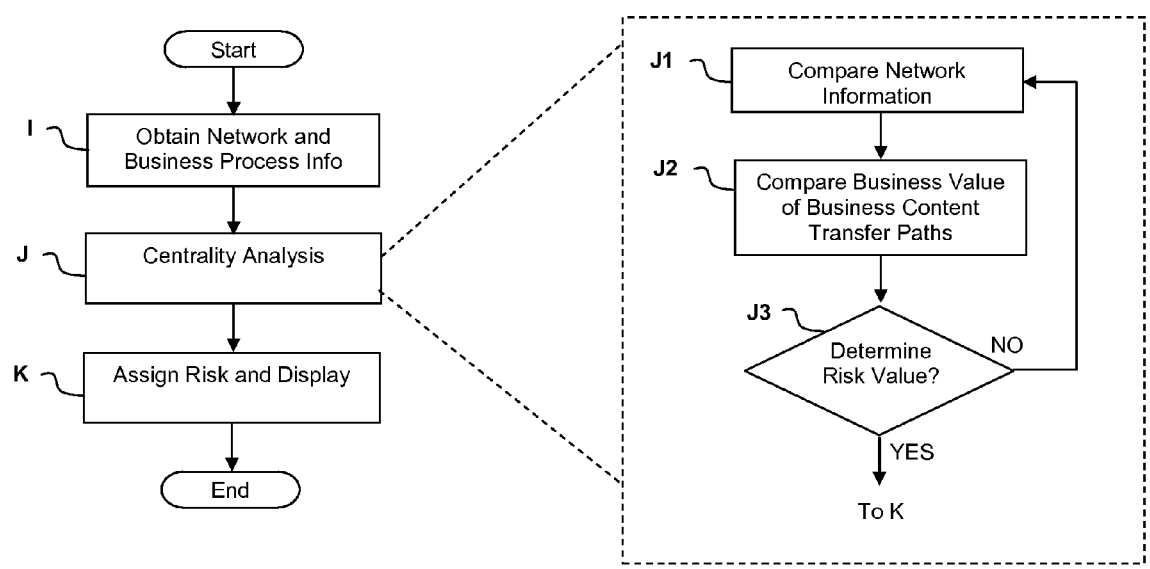
FIG. 7 depicts a process flow diagram for assigning risk in accordance with an embodiment of the present invention.

Referring now to FIG. 7, an embodiment of the invention begins at process I by obtaining data regarding the network infrastructure (e.g., traffic volume) and attributes regarding business processes (e.g., business content transfer paths) in the network. Such business content transfer paths can be obtained using, for example, embodiments of the present invention as detailed above. Using this information, the business related risk of each network component is determined.

At process J, a centrality-measuring algorithm is employed to determine a node centrality of each node in the network. Centrality can be affected by many factors, including volume of traffic, business value and financial value, and/or the like. The centrality-measuring algorithm, running on the analysis engine (e.g., analysis engine 34, FIG. 6) uses this business and network information to assign a quantifiable risk to each network component identified in each business content transfer path. Metrics can be weighted and can be adjusted by the user to create greater importance on different factors. At process K, the centrality information is assigned a risk value and displayed to a user.

Process J may include several operations. At operation J1, network information (e.g., traffic volume) is compared for each network node. At operation J2, the business value of business content transfer paths in the network are compared. The business values can be provided via user interaction to allow tagging of specific processes with business attributes, (for example, "This is my invoice chain") and a financial and business value or importance. Metrics can be weighted and can be adjusted by the user to create greater importance on different factors. Alternatively, or in addition, business values can be provided automatically (e.g., via a database of values). Other methodologies are also possible.

At operation J3, based on the results of operations J1 and J2, a risk factor is determined for each network node of each business content transfer path. If a risk factor cannot be determined for a given network node (NO, J3), operations J1 and J2 can be repeated to obtain additional information. If a risk factor is determined (YES, J3), flow passes to process K, at which a quantifiable risk to each network component identified in each business content transfer path is displayed to a user.

Additional factors for assigning a risk value may include:
1) Single point of failure: network nodes that are present in multiple business processes can be assigned a higher risk metric.
2) When multiple paths can be taken, the risk of each path is lower as there is redundancy in the system to protect against failure.
3) Nodes which are related in non-obvious ways (for example, being co-located in the same data center availability zone) may be taken into account when providing network information. Should this information be provided, then the calculated risk values will take this into account.

Figure 8:
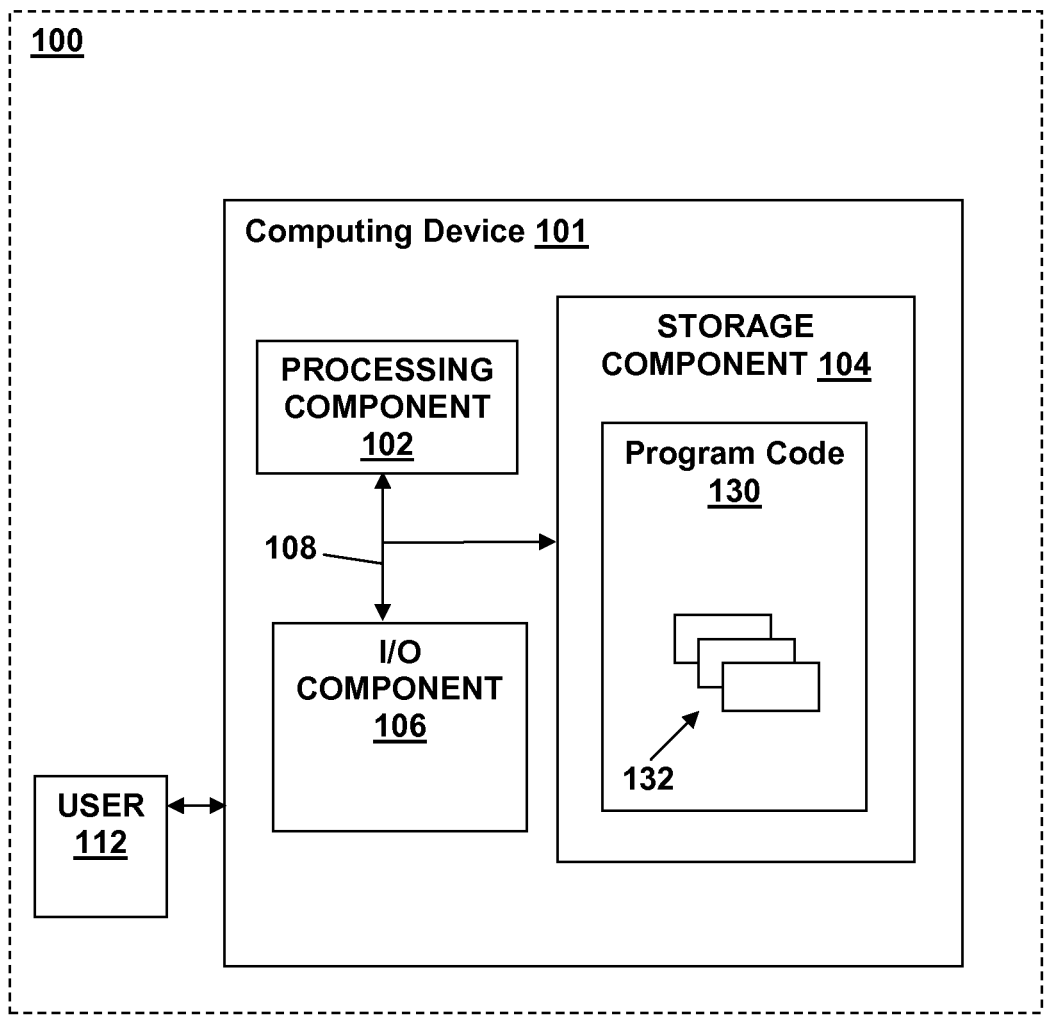
FIG. 8 depicts an illustrative environment for implementing embodiments in accordance with the present invention.

FIG. 8 shows an illustrative environment 100 for implementing embodiments in accordance with the present invention. To this extent, the environment 100 includes at least one computing device 101 that can implement, perform and/or control various processes/systems (e.g., analysis engines 18, 34, etc.) described herein.

The computing device 101 is shown including a processing component 102 (e.g., one or more processors), a storage component 104 (e.g., a storage hierarchy), an input/output (I/O) component 106 (e.g., one or more I/O interfaces and/or devices (e.g., keyboard, mouse, display screen, player, etc.), and a communications pathway 108. In general, the processing component 102 executes program code 130, which is at least partially fixed in the storage component 104, for implementing at least one of the processes/systems described herein. While executing program code 130, the processing component 102 can process data, which can result in reading and/or writing transformed data from/to the storage component 104 and/or I/O component 106 for further processing. The pathway 108 provides a communications link between each of the components in the computing device 101. The I/O component 106 can comprise one or more human I/O devices, which enable a user 112 to interact with the computing device 101 using any type of communications link. To this extent, the program code 130 can be configured to manage a set of interfaces (e.g., graphical user interface(s), application program interface(s), and/or the like) that enable user 112 interaction, and to manage (e.g., store, retrieve, create, manipulate, organize, present, etc.) data using any solution.

In any event, the computing device 101 can comprise one or more general purpose computing articles of manufacture (e.g., computing devices) capable of executing program code 130 installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program code 130 can embodied as any combination of system software and/or application software.

Further, the program code 130 can be implemented using a set of modules 132. In this case, a module 132 can enable the computing device 101 to perform a set of tasks, and can be separately developed and/or implemented apart from other portions of program code. As used herein, the term "component" means any configuration of hardware, with or without software, which implements the functionality described in conjunction therewith using any solution, while the term "module" means program code that enables the computing device 101 to implement the actions described in conjunction therewith using any solution. When fixed in a storage component 104 of the computing device 101 that includes a processing component 102, a module 132 can be a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of the computing device 101.

It is understood that the computing device 101 is merely representative of various possible equivalent computer systems that may perform a process described herein. To this extent, in other embodiments, the functionality provided by the computing device 101 can be at least partially implemented by one or more computing devices that include any combination of general and/or specific purpose hardware with or without program code 130. In each embodiment, the hardware and program code 130, if included, can be created using standard engineering and programming techniques, respectively.

While performing a process described herein, the computing device 101 can communicate with one or more other computer systems using any type of communications link. The communications link can comprise any combination of various types of wired and/or wireless links; comprise any combination of one or more types of networks; and/or utilize any combination of various types of transmission techniques and protocols.

It is understood that aspects of the invention further provide various alternative embodiments. For example, in one embodiment, the invention provides a computer program fixed in at least one computer-readable medium, which when executed, enables a computing device to implement the processes/systems in accordance with the present invention. To this extent, the computer-readable medium includes program code which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; and/or the like.

In another embodiment, the invention provides a method of providing a copy of program code 130, which implements some or all of the processes/systems described herein. In this case, a computer system can process a copy of program code 130 that implements some or all of a process described herein to generate and transmit, for reception at a second, distinct location (e.g., a mobile device, a computer system, etc.), a set of data signals that has one or more of its characteristics set and/or changed in such a manner as to encode a copy of the program code 130 in the set of data signals. Similarly, an embodiment of the invention provides a method of acquiring a copy of program code 130 that implements some or all of a process described herein, which includes a computer system, a mobile device, etc., receiving the set of data signals described herein, and translating the set of data signals into a copy of the computer program fixed in at least one computer-readable medium. In either case, the set of data signals can be transmitted/received using any type of communications link.

It is understood that aspects of the invention can be implemented as part of a business method that performs a process described herein on a subscription, advertising, and/or fee basis. For example, the service provider can manage (e.g., create, maintain, support, etc.) a computer system and/or mobile device, that performs a process described herein for one or more customers. In return, the service provider can receive payment from the customer(s) under a subscription and/or fee agreement, receive payment from the sale of advertising to one or more third parties, and/or the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a business content transfer path in a network using file transfer information, comprising:
   obtaining file transfer information for a plurality of file transfers between a plurality of nodes within a network;
   generating, by a computing device, a confidence of correlation for each pair of file transfers in the plurality of file transfers, the generating the confidence of correlation including:
      comparing file transfer sizes of the plurality of file transfers by:
         analyzing header information associated with a plurality of packet transfers;
         detecting an end of file based on the analyzed header information; and
         determining a file transfer size based on the detected end of file, the end of file detected by:
            detecting a larger than expected time gap between sequential packet transfers; and/or
            detecting a packet having a size less than a maximum packet size;
   determining interdependencies between the plurality of file transfers based on the confidence of correlation for each pair of file transfers; and
   determining a business content transfer path based on the interdependencies between the plurality of file transfers.

2. The method of claim 1, wherein obtaining the file transfer information further comprises:
   capturing packet header information for the plurality of file transfers.

3. The method of claim 1, wherein generating the confidence of correlation for each pair of file transfers in the plurality of file transfers further comprises:
   examining time gaps between the plurality of file transfers.

4. The method of claim 3, wherein examining the time gaps between the file transfers further comprises:
   comparing timestamps of the plurality of file transfers.

5. The method of claim 1, wherein generating the confidence of correlation for each pair of file transfers in the plurality of file transfers further comprises:
   examining file names of the plurality of file transfers.

6. The method of claim 1, further comprising:
   determining a value of the business content transfer path based on network information and values associated with at least one business process.

7. An apparatus for determining a business content transfer path in a network using file transfer information by performing a method, the method comprising:
   obtaining file transfer information for a plurality of file transfers between a plurality of nodes within a network;
   generating, by a computing device, a confidence of correlation for each pair of file transfers in the plurality of file transfers, the generating the confidence of correlation including:
      comparing file transfer sizes of the plurality of file transfers by:
         analyzing header information associated with a plurality of packet transfers;
         detecting an end of file based on the analyzed header information; and
         determining a file transfer size based on the detected end of file, the end of file detected by:
            detecting a larger than expected time gap between sequential packet transfers; and/or
            detecting a packet having a size less than a maximum packet size;
   determining interdependencies between the plurality of file transfers based on the confidence of correlation for each pair of file transfers; and
   determining a business content transfer path based on the interdependencies between the plurality of file transfers.

8. A computer program comprising program code embodied in at least one non-transitory computer-readable storage medium, which when executed, enables a computer system to implement a method for determining a business content transfer path in a network using file transfer information, the method comprising:
   obtaining file transfer information for a plurality of file transfers between a plurality of nodes within a network;
   generating a confidence of correlation for each pair of file transfers in the plurality of file transfers, the generating the confidence of correlation including:
      comparing file transfer sizes of the plurality of file transfers by:

analyzing header information associated with a plurality of packet transfers;

detecting an end of file based on the analyzed header information; and determining a file transfer size based on the detected end of file, the end of file detected by:

detecting a larger than expected time gap between sequential packet transfers; and/or detecting a packet having a size less than a maximum packet size;

determining interdependencies between the plurality of file transfers based on the confidence of correlation for each pair of file transfers; and determining a business content transfer path based on the interdependencies between the plurality of file transfers.

9. The computer program of claim 8, wherein obtaining the file transfer information further comprises:

capturing packet header information for the plurality of file transfers.

10. The computer program of claim 8, wherein generating the confidence of correlation for each pair of file transfers in the plurality of file transfers further comprises:

examining time gaps between the plurality of file transfers.

11. The computer program of claim 10, wherein examining the time gaps between the file transfers further comprises:

comparing timestamps of the plurality of file transfers.

12. The computer program of claim 8, wherein generating the confidence of correlation for each pair of file transfers in the plurality of file transfers further comprises:

examining file names of the plurality of file transfers.

13. The computer program of claim 8, further comprising:

determining a value of the business content transfer path based on network information and values associated with at least one business process.

\* \* \* \* \*